US011631144B2

(12) United States Patent
Waweru et al.

(10) Patent No.: US 11,631,144 B2
(45) Date of Patent: Apr. 18, 2023

(54) CROWDFUNDING ENDORSEMENT USING NON-INTERNET ENABLED DEVICES

(71) Applicant: International Business Machines Corporation, Armonk, NY (US)

(72) Inventors: Peninah Mugure Waweru, Kerarapon (KE); Felix Bonard Kwizera, Nairobi (KE); Abdigani Diriye, Nairobi (KE); Lola Aleru, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 16/671,136

(22) Filed: Oct. 31, 2019

(65) Prior Publication Data

US 2021/0133897 A1 May 6, 2021

(51) Int. Cl.
| | |
|---|---|
| *G06Q 50/00* | (2012.01) |
| *G06Q 30/02* | (2012.01) |
| *G06N 20/00* | (2019.01) |
| *G06F 40/205* | (2020.01) |
| *G06Q 30/0204* | (2023.01) |
| *G06Q 30/0279* | (2023.01) |
| *G06Q 30/0201* | (2023.01) |

(52) U.S. Cl.
CPC ............. *G06Q 50/01* (2013.01); *G06N 20/00* (2019.01); *G06Q 30/0201* (2013.01); *G06Q 30/0205* (2013.01); *G06Q 30/0279* (2013.01); *G06F 40/205* (2020.01)

(58) Field of Classification Search
None
See application file for complete search history.

(56) References Cited

U.S. PATENT DOCUMENTS

| | | | |
|---|---|---|---|
| 8,010,460 | B2 | 8/2011 | Work et al. |
| 8,359,328 | B2 | 1/2013 | Hom et al. |
| 8,473,421 | B2 | 6/2013 | Scalisi |
| 2010/0114685 | A1 | 5/2010 | Blass |
| 2013/0103603 | A1* | 4/2013 | Merriman .......... G06Q 30/0279 |
| | | | 705/329 |
| 2013/0151432 | A1 | 6/2013 | Kashner et al. |
| 2013/0282610 | A1 | 10/2013 | Hungerford |
| 2013/0291098 | A1 | 10/2013 | Chung et al. |
| 2014/0012780 | A1 | 1/2014 | Sanders |

(Continued)

*Primary Examiner* — Jan P Mincarelli
(74) *Attorney, Agent, or Firm* — Shimon Benjamin; Bhaskar Pandey; Lou Percello, Attorney, PLLC

(57) ABSTRACT

Embodiments of the present invention include a crowdfunding platform comprising one or more computer systems, one or more memories, and one or more central processing units (CPUs). The crowdfunding platform has one or more alternative interfaces to one or more alternative networks. The alternative networks are not capable of operating directly with the Internet. There are also one or more Internet interfaces to the Internet. A crowdfunding platform receives information about a crowdfunding project from one of the alternative interfaces, processes the information into processed information, sends the processed information over one of the Internet interfaces. Further, the crowdfunding platform receives Internet information over one of the Internet interfaces, translates the Internet information into transformed information, and sends the transformed information over one of the alternative interfaces.

19 Claims, 11 Drawing Sheets

(56) References Cited

U.S. PATENT DOCUMENTS

2015/0310515 A1* 10/2015 Zamer ................ G06Q 30/0605
                                                    705/26.2
2016/0225037 A1    8/2016 Ezumba
2018/0300763 A1* 10/2018 Hoang ................. G06F 16/951

* cited by examiner

195

CROWDFUNDING ENDORSEMENT USING NON-INTERNET ENABLED DEVICES

BACKGROUND

The present invention relates to crowdfunding endorsements, and more specifically, to crowdfunding endorsements using non-internet enabled devices.

Crowdfunding raises funding for businesses, causes, charities, activities, and many other purposes by appealing to individuals using social networks. As such, social media/networks play a critical role in crowdfunding platforms. A person's ability to access a social network can impact the success or failure of crowdfunding a campaign. Not only does the social network enable a person to reach large numbers of people, often the same social network validates a crowdfunding campaign and makes people more willing to donate. The confidence placed in the information shared about the campaign is often associated with the reputation of the person(s) using and/or associated with the social network used for the crowdfunding.

However, in developing markets, the low penetration of rate of Internet-enabled devices can limit access to social media and therefore limit crowdfunding opportunities. For example, areas with constrained access to the Internet, computers, and/or smart phones may not have access to social networks. In some of these areas people may only have access to feature phones.

Gaining support for a crowdfunding campaign is near impossible in this environment. To help these economies, crowdfunding opportunities need to be made available with non-Internet based methods. Crowdfunding these campaigns needs to be fast and efficient, but also there is a need to evaluate and validate these campaigns to achieve transparency and creditability. Donors need to understand how to evaluate and value the campaign. The campaign providers need to understand the best ways to operate the campaign, inform donors, understand tax issues, etc.

SUMMARY

Embodiments of the present invention include a crowdfunding platform comprising one or more computer systems, one or more memories, and one or more central processing units (CPUs). The crowdfunding platform has one or more alternative interfaces to one or more alternative networks. The alternative networks are not capable of directly operating with the Internet. There are also one or more Internet interfaces to the Internet. A crowdfunding platform receives information about a crowdfunding project from one of the alternative interfaces, processes the information into processed information, sends the processed information over one of the Internet interfaces. Further, the crowdfunding platform receives Internet information over one of the Internet interfaces, transforms the Internet information into transformed information, and sends the transformed information over one of the alternative interfaces. Methods of operation and systems are also disclosed.

BRIEF DESCRIPTION OF THE DRAWINGS

Various embodiments of the present invention will be described below in more detail, with reference to the accompanying drawings, now briefly described. The Figures show various apparatus, structures, and related method steps of the present invention.

DETAILED DESCRIPTION

Figure 1:
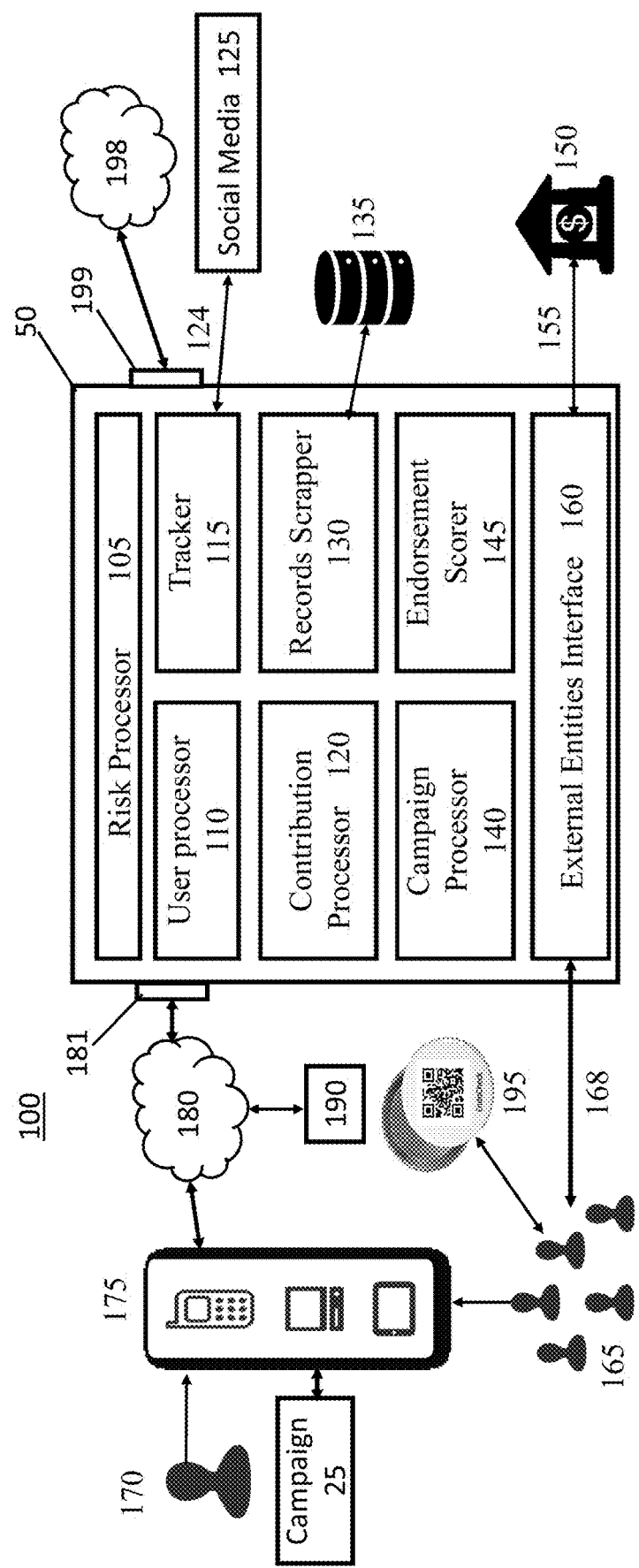
FIG. 1 is a block diagram of one embodiment of a crowdfunding endorsement system.

It is to be understood that embodiments of the present invention are not limited to the illustrative methods, apparatus, structures, systems, and devices disclosed herein but instead are more broadly applicable to other alternative and broader methods, apparatus, structures, systems and devices that will become evident to those skilled in the art given this disclosure.

In addition, it is to be understood that the various features shown in the accompanying drawings are not drawn to scale, and that one or more features of a type commonly used may not be explicitly shown in any given drawing. This does not imply that the features not explicitly shown are omitted from the actual methods, apparatus, structures, systems, and/or devices.

In addition, certain elements may be left out of a figure for the sake of clarity and/or simplicity when explanations are not necessarily focused on such omitted elements. Moreover, the same or similar reference numbers used throughout the drawings are used to denote the same or similar features, elements, method steps, or structures, and thus, a detailed explanation of the same or similar features, elements, method steps, or structures may not be repeated for each of the drawings.

The methods, features, apparatus, structures, systems, methods, and/or devices disclosed in accordance with embodiments of the present invention can be employed in applications, hardware, and/or electronic systems. Suitable hardware and systems for implementing embodiments of the invention may include, but are not limited to, personal computers, communication networks, electronic commerce systems, portable communications devices (e.g., feature phones or cell and smart phones), solid-state media storage devices, expert and artificial intelligence systems, functional circuitry, neural networks, etc. Systems and hardware incorporating the invention are contemplated embodiments of the invention.

It is understood that the meaning of terms might be affected by the orientation of the device described. For example, while the meaning of these descriptions might change if the device was rotated upside down, the descriptions remain valid because they describe relative relationships between features of the invention.

Crowdfunding devices, apparatus, systems, and methods are disclosed that are capable of functioning without a campaign provider (also referred to as a user) or donors being connected to the Internet. In some embodiments, the user has a communication device like a feature phone that use protocols that work on a mobile device or telephone networks but not on the Internet. These protocols include but are not limited to Unstructured Supplementary Service Data (USSD) or Short Message Service (SMS). The invention enables donor/user/campaign provider access to social networks through alternative communication systems. Campaign providers using this crowdfunding platform invention can connect with large numbers of donors in a crowdfunding campaign through social networks.

In addition, the system enables evaluation and validation of the reputation of the campaign manager and campaign purpose, efficient use and raising of funding, access to organizational funding, fraud detection, risk analysis, and updates about the campaign progress. These and other features of the invention render the campaign transparent and credible, give donors confidence and trust, and provide a platform for raising funds and managing those funds efficiently to achieve the goals of the campaign.

Referring now to the Figures.

FIG. 1 is a block diagram of one embodiment of a crowdfunding endorsement system 100.

The crowdfunding endorsement system 100 comprises a crowdfunding platform 50 that has a connection to internet 198 through one or more standard network connections/interfaces 199. The crowdfunding platform 50 also connects to one or more alternate networks 180 through standard alternative network interfaces 181. The alternate networks 180 are not Internet based and include but are not limited to mobile device networks or telephone networks 180. The crowdfunding platform 50 can reside on one or more servers with these network connections (181, 199). The server and crowdfunding platform 50 can be provided/managed by network provider, Internet service provider, phone company, and/or other third party. The crowdfunding platform 50 comprises one or more computers with memories and central processing units (CPUs). The crowdfunding platform 50 transacts/communicates (sends and receives) information, requests, and processes and provides functions through the alternate network 180, through devices 175, and to the campaign provider 170 and campaign participants/donors 165. The crowdfunding platform 50 also communicates with the Internet 198, e.g. social media 125. The crowdfunding platform 50 processes/transforms information received from the alternative networks 180 and Internet 198 and sends the transformed/translated information to the other network.

The devices 175 include any computer input/output device 175 including but not limited to feature phones, cell phones, computers, laptops, etc. It is envisioned that many/most of the campaign providers 170 and donors/pledgers 165 will have feature phones, without full Internet function. However, the invention also can work with devices 175 with high functionality that may not be fully Internet functional because of the limitations of the alternative network 180 connections.

The crowdfunding platform 50 provides multiple functions to the campaign provider 170 and donors 165 through the devices 175. Some functions include connection to and access to information on the Internet 198, e.g. social media 125. Other functions include but are not limited to campaign provider/user 170 processing and/or evaluation 110; social media tracking 115; contribution processing 120; records scrapping 130 and storage (e.g. of verified records) 135; campaign processing 140; endorsement scoring 145; connections/interface 155 to an external entities 160, e.g. government programs/agencies, financial institutions, loans, investor capital, non-governmental organizations grants/aid 150; and risk analysis/processing 105.

In addition, the crowdfunding platform 50 provides various endorsement and/or validation data through interfaces 190 to the donors 165 to certify and validate the campaign 25 and provide monitoring and transparency of the campaign 25 to the donors 165. This endorsement data includes but is not limited to Quick Response Code (QR) code badges 195; graphical user interfaces (GUI) 190 that can provide buttons, links, interfaces (input and output), status, etc. through devices 175 with limited function; and information templates 190 like endorsement check pages, that also work with limited function devices 175.

Functions (e.g. 105, 110, 115, 120, 130, 140, 145, 160, etc.) within the crowdfunding platform 50 are connected by one or more system buses and/or other connections (not shown) so that they can exchange information with one another.

The user processor 110 parses the user's request message and determines the campaign cause, the amount requested, resources needed, scheduling and timing, specific project features (e.g. road access, climate conditions, etc.), geographical information, estimated costs and cash flows, personal and professional information about the campaign provider 170 and key members of the campaign team, information about a network of people the campaign provider 170 knows that have financial capacity and/or can provide other (e.g. in-kind) help, relevant people and resources accessible on social networks/media, banking and financial information known by the campaign provider 170, etc. See the description of FIG. 2 for more information about the user process 110.

The connection 124 to social media 125 can be through the Internet 198 and/or through other known direct or indirect (e.g. through the crowdfunding platform 50) connections. The social networks/media include but are not limited to large social media providers like Facebook, Twitter, Instagram, etc. and/or private social media/networks like corporate or private social media networks, government agencies or non-government organizations (NGO's) that may have public or private networks to promote campaigns 25.

The social media tracker 115 tracks how much of a social media presence the user 170 and campaign are getting on the various social media platforms 125. In some embodiments, the social media tracker 115 analyzes postings and commentaries to determine attitudes, concerns, support, etc. for the campaign 25, campaign operations, and campaign provider 170.

In some embodiments, the tracker 115 matches potential donors 165 to the campaign 25 based on potential donor data such as Global System for Mobile Communications (GSM) data, mobile money (MM), online data, and social media activity 125. This data includes potential donor location, interests, prior donation history, frequency of donations, donation patterns, characteristics of prior campaign donations, one or more prior in-kind donations made by a donor, etc. This historical data is parsed and used to match objectives of the campaign 25.

In some embodiments, the tracker 115 uses natural language processing (NLP) and machine learning techniques (e.g. neural networks and rule-based systems) to analyze this data to determine suggested donation amounts and frequency of donation. In some embodiments, a decay function is applied to historic data (e.g. GSM data, mobile money or social media data) to dynamically assign lower weigh to older historical data.

The contributions process 120 receives and processes pledges and donations. The contribution process 120 can also perform administrative functions like maintaining a donor contact list, making sure that pledges are fulfilled, etc., gathering information about donors (e.g. other campaigns donated to, donor interests and concerns), etc.

The records scraper 130 finds information relevant to the campaign 25 and stores this information in records in a database 135. Relevant information can include but not limited to success data about prior campaigns in the vicinity, success data of campaigns both using social media donor groups and not using social media groups, demographics and interest profiles of donors 165 participating in this campaign 25 and similar campaigns.

This information can be obtained in many ways including but not limited to network searches, research (e.g. in libraries, etc.), surveys, feedback from e-mails, studies by government agencies and private research groups, consultants, etc. The records scrapper 130 can find publicly available information/records related to the campaign 25 and/or campaign provider 170. In some embodiments, the crowdfunding platform 50 can access to Global System for Mobile Communications (GSM) data, mobile money (MM) data, bank records, government databases, medical records) and categorized and record this information.

The campaign processor 140 keeps track of the campaign details such as time, amount raised, donor details etc. It tracks the campaign messaging and coordinates time, manner, and approach the campaign has with the social network 125, donors 165, pledgers 165, and other participants.

In some embodiments, the endorsement scorer 145 has programs that monitor, score, and/or rank the progress of the campaign 25 with respect to one or more goals and/or criteria. For example, a scoring process can include a measurement and scoring of the trustworthiness of the campaign provider 170 with the donors or potential donors 165. Another measurement might be the popularity of the campaign 25 with people on the social network 125. Still another might be a comparison of the fund raising versus the amount of money and resources needed at a given time in the campaign or an amount of progress in completing a campaign project versus the expectations of the donors 165.

The endorsement scorer 145 can function differently during some phases of the campaign 25 than others. For example, in some embodiments, monitoring and scoring of fundraising might only occur during the time donors 165 are contributing. For other embodiments, the monitoring and scoring of funding 145 can start when the campaign 25 starts and continue until all projects related to the campaign 25 are completed. In this case not only is the fund raising monitored but also how the funding is spent in relation to meeting milestones of the project. Tracking and scoring of this and other information provides transparency to the donors 165, financial institutions 150, and public and adds to the credibility and trustworthiness of the campaign provider 170 and campaign 25.

In some embodiments, the endorsement scorer 145 continuously updates the endorsement rating of the campaign 25 up until meeting a certain threshold. Once passing the threshold, the campaign 25 becomes verified. For example, potential donors understand that once a financial institution; government agency, and/or NGO 150 has reviewed and approved certain requirements on an application and/or has donated above a certain amount of money; the campaign 25 has reached a legitimacy that warrants participation. In another example, certain institutions, government agencies, and/or NGO's 150 may not be authorized to contribute to a campaign unless certain criteria of the campaign are achieved. These criteria might include certifications of architects, engineers, and/or medical people; completion of site studies; environmental impacts; approvals of indigenous peoples; project benefit to the population or region; funding levels achieved, etc. Measures of compliance with these criteria can be used as measures in one or more scoring methods used in the endorsement scorer 145.

The external entities interface 160 contains hardware; software, and/or protocols (passwords, etc.) to connect (155, 168) with organizations like government agencies, NGO's, and financial institutions 150 and individual donors 165. In some embodiments, the external entities interface 160 includes standard forms and contracts required by these organizations 150 and donors 165. The external entities interface 160 also has processes that parse and manage information requirements for these forms and contracts that the crowdfunding platform 50 can provide 168 to donors and/or the campaign provider 170 through alternative network connections (168, 180) so that the donors 168 and/or campaign provider 170 can provide the required/requested information through devices 175. The external entities interface 160 then formats/transforms the information provided 168 from the donors 165 and campaign provider 170 and transmits 155 the information to the institutions 150 in form/contract/application format required. In addition, when the institutions 150 transmit 155 information/requests back to the donors 165 and/or campaign provider 170, the external entities interface 160 parses the information and breaks the information down into messages (e.g. processes/transforms) that can be transmitted 168 to the donors 165 and/or campaign provider 170 through the alternative network connections (168, 180) and devices 175.

The risk processor 105 is a process that evaluates and monitors a project to determine various risks associated with the campaign 25. Risks include failure to raise enough funding, failure to raise funding on time, weather risks, inefficiencies, transportation risks, fraud, spam and virus attacks, etc. The risk processor 105 has risk assessment tools and processors that take information from the different functions of the crowdfunding platform 50 (e.g. user processor 110, contribution processor 120, campaign processor 140, endorsement scorer 145, etc.) and other sources and reports one or more risks, either separately and/or in aggregate and provides the impacts of the risks on the campaign 25 to donors 165, institutions, and/or the campaign provider 170.

Figure 2:
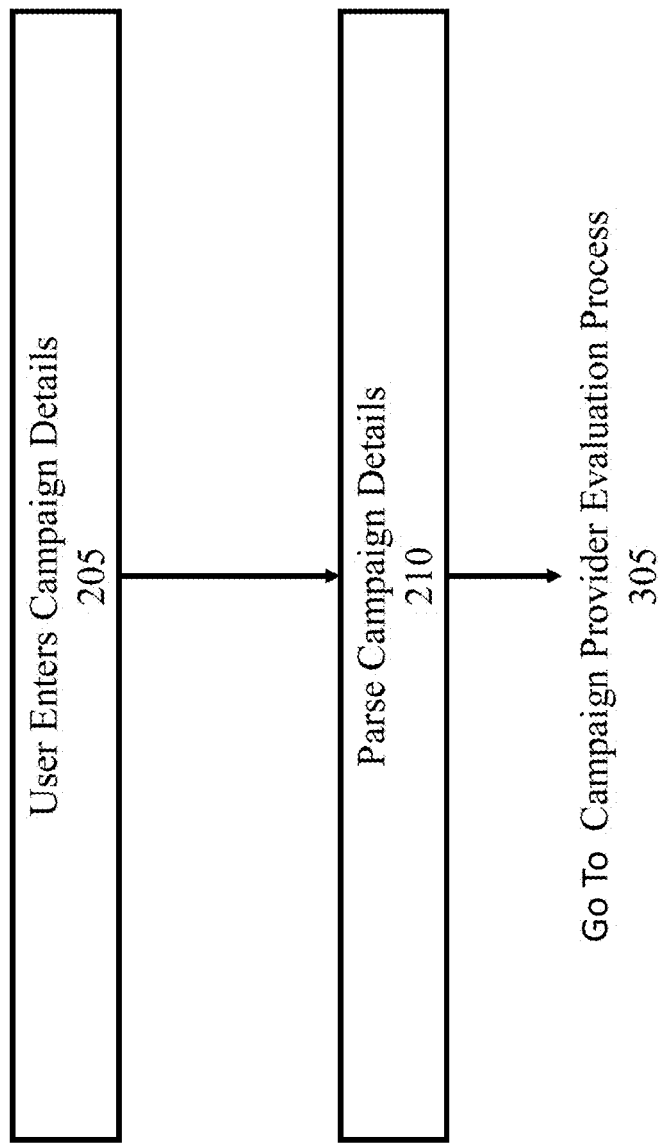
FIG. 2 is a flow chart showing the steps of a campaign provider/user input process.

FIG. 2 is a flow chart showing the steps of a campaign provider/user input process 200.

In step 205, the campaign provider 170 enters campaign details. In some embodiments, the campaign details are entered into a template that is provided on the device 175.

In step 210, the campaign details are parsed to determine the campaign 25 elements like the campaign purpose, the amount requested, the campaign provider's personal information, potential donors geographically close to the campaign (from their GSM data) that have the financial capacity to help (from their MM data), and individuals and organizations 150 identified as possible donors 165 on social media 125.

In some embodiments, information required by institutions 150 like forms/contracts are requested and parsed in step 210. Information can be obtained by natural language processing (NLP) of the campaign provider 170 input, accessing and NLP processing of information available on the Internet (e.g. GSM and MM data), and/or information available from other public sources. Information can include but are not limited to location of the projects and individuals, financial status, project scheduling, etc.

Parsed information 210 and other information obtained is accessible to other functions in the crowdfunding platform 50, e.g. contribution processor 120, campaign processor 140, endorsement scorer 145, and external entities interface 160.

Figure 3:
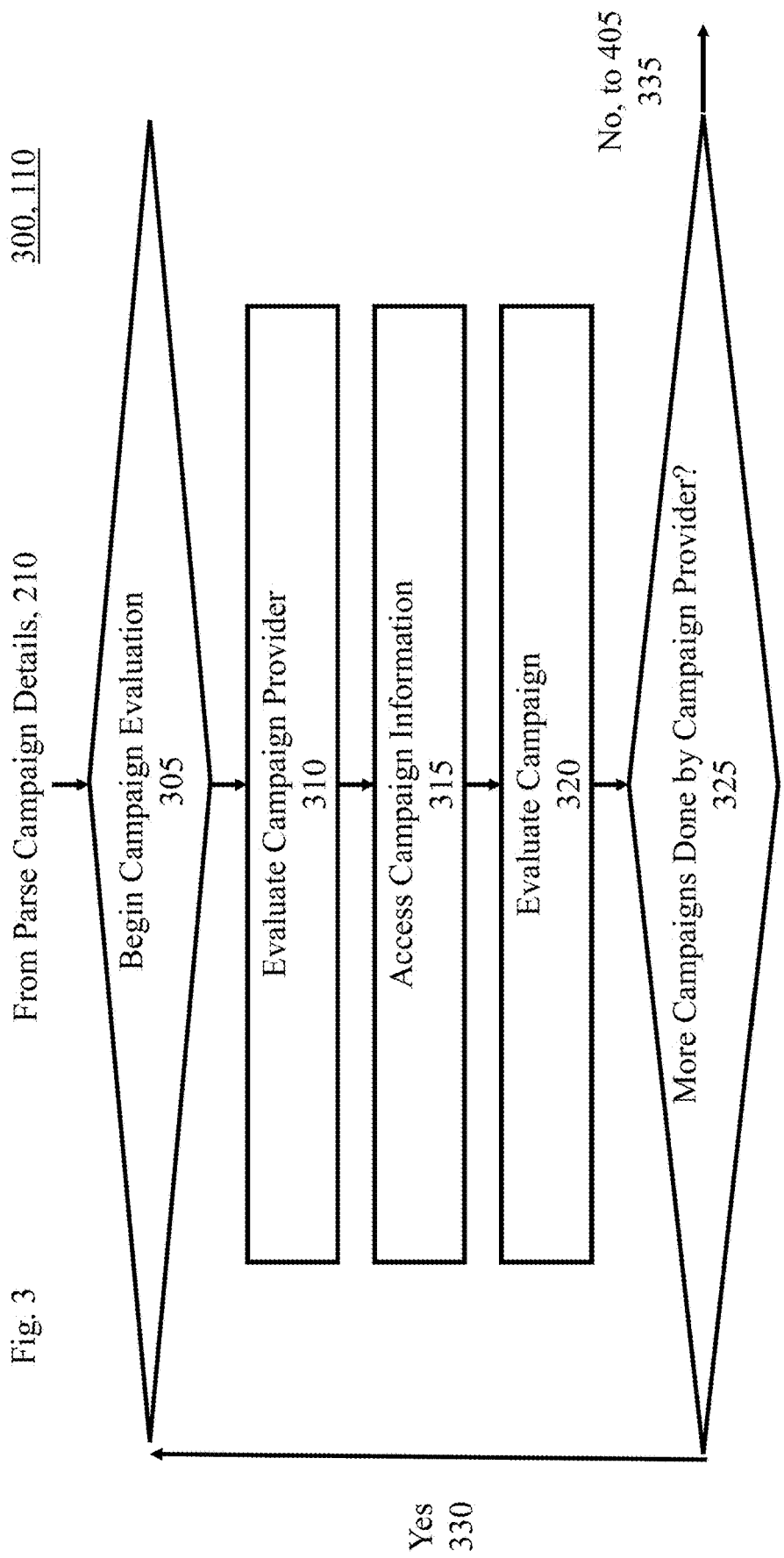
FIG. 3 is a flow chart showing steps for evaluating the campaign provider and campaign.

FIG. 3 is a flow chart showing the steps for evaluating 300 the campaign provider 170 and campaign 25.

Step 305 takes the parsed and NLP analyzed information from step 210 and other information that may be needed from other functions in the crowdfunding platform 50 to begin the evaluation 305 of the campaign 25.

In some embodiments of step 310, a machine learning (e.g. rule-based) system is used to evaluate the campaign provider 170. The campaign provider 170 entered information (110, 205) is entered into the machine learning system and the outcomes are checked against criteria that determine whether the campaign 25 is valid and/or likely to achieve stated objectives. In some embodiments, the information provided by the campaign provider 170 is verified by doing checks against information searched on the Internet, from public documents or from other information sources. In some embodiments, elements of the provided information and/or elements of the outcomes are weighted to obtain a more accurate outcome.

For example, in step 310 the user processor 110 does a search to find information about the campaign provider 170. The search may include an Internet search through the Internet interface 199. Information is obtained from references and people that have had past business dealings with the campaign provider 170, e.g. former employers, employees, lenders, etc. Information about projects done by the campaign provider is obtained and reviewed.

In step 315, similar information is obtained and reviewed from other individuals associated with the campaign 25. For example, information is gathered about individuals that have contributed large donations to the campaign and/or that will have ownership, gain benefit, or otherwise have some stake in the campaign.

In some embodiments in step 315, information about the campaign 25 is used to define and identify other campaigns that are similar. This information analyzes success of prior campaigns and/or problems or risks incurred. The current campaign is compared to similar historical campaigns and analysis is performed to determine what measures are taken to address the former problems and risks.

In step 320 machine learning techniques are used to access the risks of the campaign 25, benefits to society, chances of success, etc.

In step 325, a decision is made about whether there are more similar campaigns to analyze, i.e. either prior campaigns associated with the campaign provider 170 and/or prior similar campaigns 25. If there are, the process is repeated 330 from step 305 until all campaigns are analyzed at which point the process evaluating the campaign 25 and campaign provider 170 ends 335.

Figure 4:
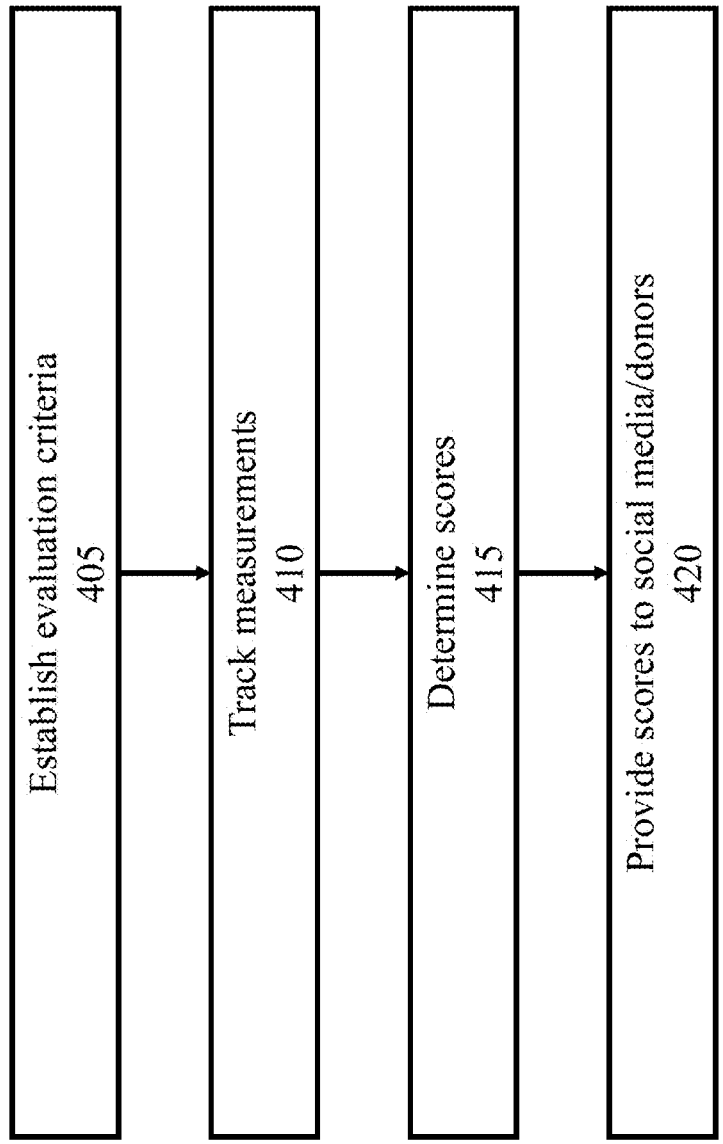
FIG. 4 is a flow chart of endorsement scorer process for the campaign and campaign provider.

FIG. 4 is a flow chart of endorsement scorer process 145 for the campaign 25 and campaign provider 170.

Step 405 establishes evaluation criteria for the campaign 25 and campaign provider 170 and measurements for the evaluation criteria that can relate to a score. For example, to score interest in the campaign a number of hits on a web site can be counted and the number of hits can be related to a public interest criteria score.

Achieved funding targets can be related to a funding score. For example, if the total funding goal is $100,000 and donors have provided funding reaching $25,000, the funding score might be 25 out of 100 because 25% of the entire funding goal was achieved. Funding scores can be used during project operation as well. For example, if a construction milestone is verified by an inspector and the milestone corresponds to spending 10% of the funding, a project management score is developed to reflect that accomplishment. The score might be improved if the milestone was achieved ahead of schedule and/or under budget and likewise the score might be diminished if the milestone was behind schedule and/or over budget.

Scoring can be developed for credibility as well. For example, the more money that is invested by sophisticated inventors, e.g. large banks, the high the credibility score would be. Also, the more demonstrated prior campaign successes by the campaign provider 170, the higher the campaign provider score would be.

Alternative scoring systems are envisioned that related to the fundraising and performance of the campaign.

Step 410 tracks measurements. For example, site hits on one or more campaign websites are monitored and received through the Internet interface 199 and stored in memory locations like 135 by functions like the records scraper. Pledge amounts, donation amounts, and donor 165 identities are received from functions like the contribution processor 120 and/or institutions 150 and stored as well. Functions like the user processor provide information about the campaign and/or campaign provider 170 are stored also.

Step 415 determines the scores for each criterion. In some embodiments, weighting is used. For example, a contribution from a sophisticated investor or an important accomplishment by the campaign provider 170 can be given more weight in the score determination than other factors. All the scores and/or groups of scores might be aggregated into a combined scoring.

Step 420 provides the scores to the donors 165, pledgers 165, campaign provider 170, institutions 150, and/or public. For example, the scores can be posted on websites and/or social media 125 via the Internet 198 interface 199. The criteria, measurements, and methods of scoring can also be posted. Scores can update periodically.

In addition, step 420 posts the same or similar information to the donors and pledgers 165 that do not have Internet access. This communication is done through the alternate network 180 interface 181 to devices 175 that may not have Internet 198 connections or capability. In some embodiments, the information is provided through USSD or SMS messages. In other embodiments, the information is provided 410 to the devices by templates and/or other tokens.

Therefore, by using the crowdfunding platform 50 donors and pledgers 165 and others that do not have access to the Internet 198 or devices 175 with enhanced capability can do crowdfunding with access to sophisticated tools and enhanced device capability. In addition, the crowdfunding platform 50 provides these donors and pledgers 165 access to the Internet, social media 125, and funding sources 150 that would be otherwise unavailable.

Figure 5:
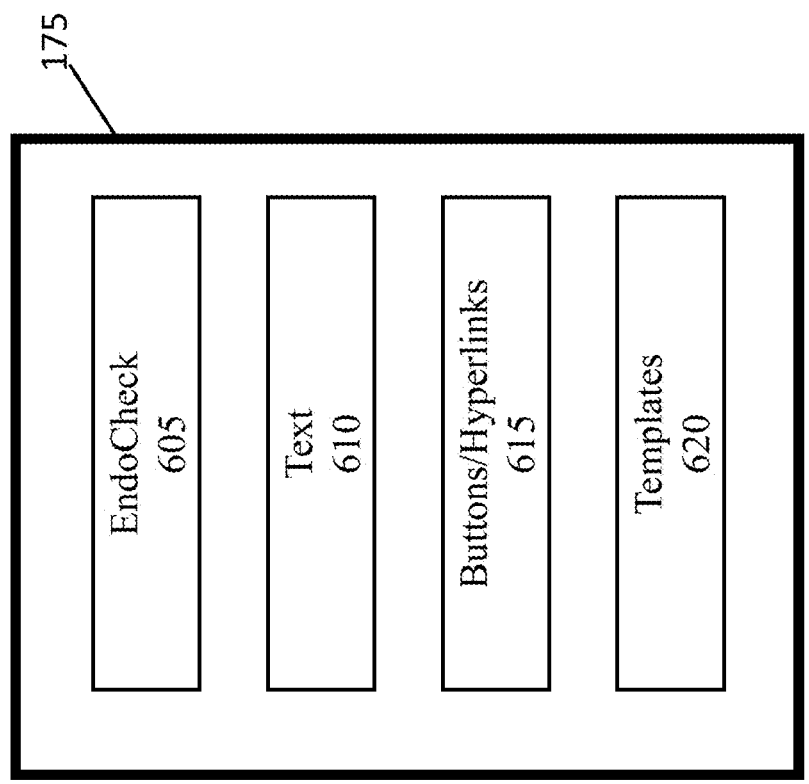
FIG. 5 is an embodiment of a graphical user interface (GUI) used by the crowdfunding platform.

FIG. 5 is an embodiment of a graphical user interface (GUI) 500 and device interface 190 used by the crowdfunding platform 50.

In some embodiments, the interface 190 is on a device 175 like a feature phone 175 or other low functionality device. The device 175 can also be on a higher functionality device 175 like a cell phone 175 that does not have access to high level services like the Internet.

In some embodiments, one or more graphical user interfaces (GUI) 500 contain one or more features or functions that are displayed on the GUI 500 to the user (165, 170). In some embodiments these features/functions include but are not limited to tokens, e.g. EndoCheck 605; text areas 610; buttons and/or hyperlinks 615; and templates 620.

In some embodiments, the Endorsement Check (Endo-Check) 605 is a button with a color. In some embodiments more than one EndoCheck buttons is provided each with a color represent scores evaluating different aspects of the campaign like the campaign provider 170 reputation, campaign finances, objectives reached, etc. In some embodiments, the user (165, 170) can press the EndoCheck button 605 to receive a breakdown of the information. The breakdown can include information about scoring methods, measurement data, historical data, endorsement details, experience, prior projects, etc.

The GUI can have one or more text fields 610. The crowdfunding platform 50 can send text information and notifications 610 to the donors 165 campaign provider 170. For example, text messages might include updates on achieving funding goals, donations by a new donor, milestone achievement, etc. The crowdfunding platform 50 can obtain this information from the Internet or other sources, transform the information, and send the transformed information over the alternative network 180 interface 181. Conversely the donors 165 and other users 170 can communicate text messages to the crowdfunding platform 50 as well through the text fields 610 which can be transformed into information provided through the Internet 198 interface 199 to social media 125, institutions 150, etc.

The button and hyperlink fields 615 can access information in the crowdfunding platform 50, e.g. in storage 135, that is linked to the field 615. In addition, the crowdfunding platform 50 can access information through the Internet 198 interface 199 if the Internet information, e.g. social media posts, is associated with the button/hyperlink field 615. Such information would be provided to the device 175 in a format the device 175 can interpret through the alternative network 180 interface 181.

The template field 620 provide textual fields and other input/output functions arranged in a format. For example, if a financial institution 150 requires an application form filled out with certain information, such information can be entered by the user 170 into the template field 620. The crowdfunding platform 50 would then fill out the application with the template provided information and submit 155 the application to the institution 150. If information is missing or the application is incomplete, the institution 150 can send 155 a request to the crowdfunding platform 50 which in turn would send 180 a request for the missing information to the user/campaign provider 170, e.g. by a template 620.

Figure 6:
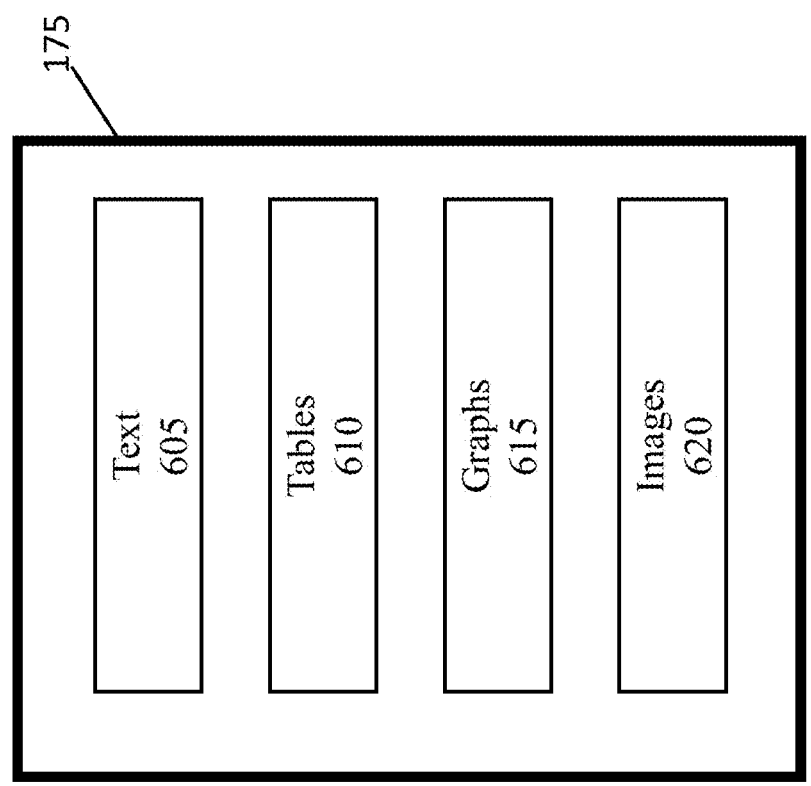
FIG. 6 is an embodiment of GUI endorsement check page.

FIG. 6 is an embodiment of GUI endorsement check page 600. The endorsement check page 600 is a token, one or more text and/or image fields, or one or more templates that provide more information to and communication with the donors 165 and campaign provider 170. For example, the endorsement check page 600 specific information about the campaign provider 170, e.g. the history of a prior project. Alternatively, the endorsement check page 600 might have detailed tables of donor contributions or campaign expenditures.

In some embodiments, access to one or more endorsement check pages 600 is through the buttons and hyperlinks field 615.

The GUI 500 showing the endorsement check page 600 can contain information as text 605, tables 610, graphs 615, and/or images 620 or any other information that can be processed by the device 175.

Figure 7:
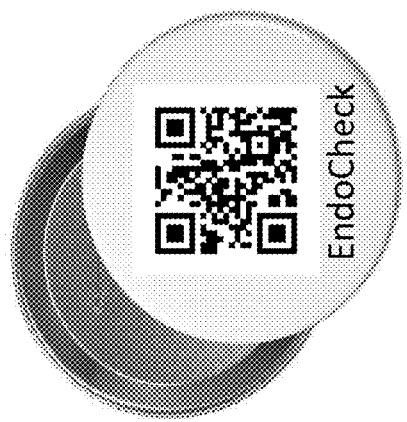
FIG. 7 is an embodiment of an endorsement badge.

FIG. 7 is an embodiment of an endorsement badge 700.

An endorsement badge (195, 700) is a token that has aspects of providing information, security, and trademark recognition for the crowdfunding. The endorsement badge (195, 700) can provide information such as numerical scores and/or color-coding representing scores and/or crowdfunding status. The endorsement badge (195, 700) can have image or other coding that permits access to the crowdfunding platform 50 and information residing there or accessible from the crowdfunding platform 50. For example, access can be provided via QR codes, short codes (e.g. *544 #) and telephone numbers.

The endorsement badge (195, 700) can also be used as an emblem put on physical material, worn on clothing, stored as an image in one or more devices 175, put on posters, or posted on social networks. Access information on the endorsement badge (195, 700) can be modified to restrict to access to levels of privileged information.

Figure 8:
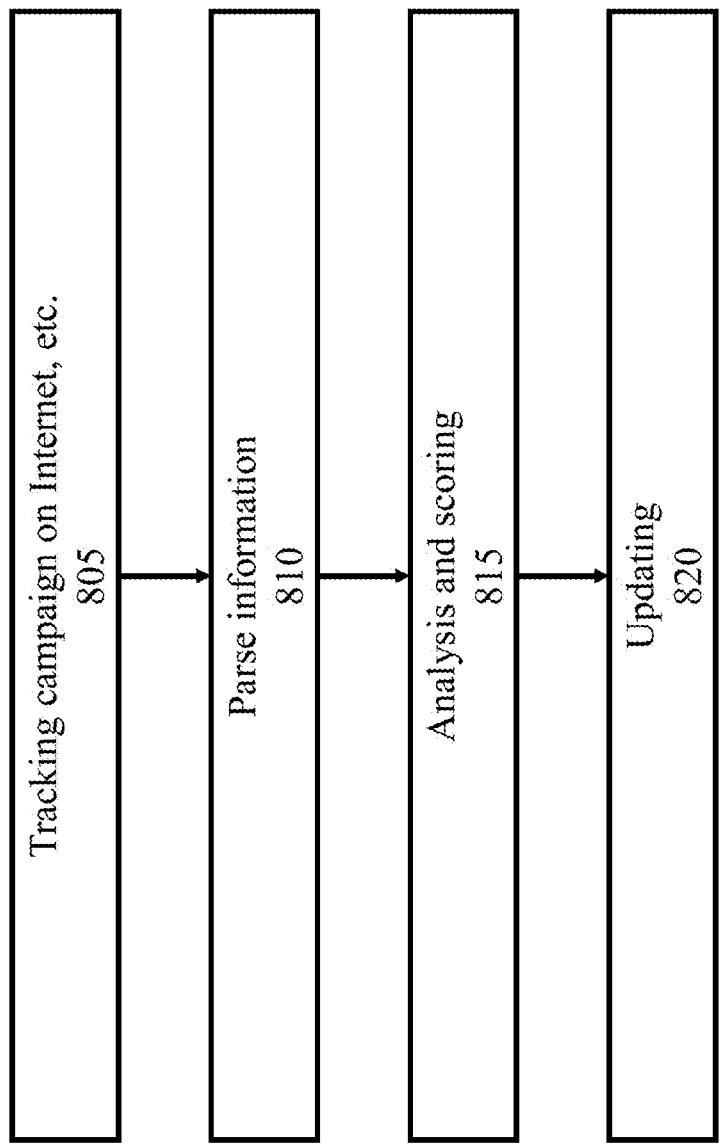
FIG. 8 is a flow chart of a campaign tracking process.

FIG. 8 is a flow chart of one embodiment of a campaign tracking process (800, 115).

Step 805 of the tracking process tracks information about the campaign 25 on the Internet 198 and other information sources. Information relevant to the campaign accessed from other sources is tracked as well. For example, tracked information includes but is not limited to weather information from government agencies 150, public interest from social media 125, milestone progress and quality from inspection agency 150 databases, and financial information, e.g. donations and cash flows, from lender databases and other institutional 150 sources.

In some embodiments, information is also gathered from within the crowdsourcing platform 50. For example, the contribution processor 120 would provide status of contributions, the campaign processor 140 would provide status of the campaign 25, and the endorsement scorer 145 would provide current scores.

In some embodiments, the tracker 115 matches potential donors 165 to the campaign 25 based on potential donor data such as Global System for Mobile Communications (GSM) data, mobile money (MM), online data, and social media activity 125. This data includes potential donor location, interests, prior donation history, frequency of donations, donation patterns, characteristics of prior campaigns, etc. This historical data is parsed and used to match objectives of the campaign 25.

Step 810 parses the information and organizes the information for later analysis 815. In some embodiments, natural language processing (NLP) is used to obtain usable information from the sources.

Step 815 uses machine learning techniques (e.g. neural networks and rule-based systems to analyze this data to determine new scores 415 and assessments for measurements for endorsements, risks, funding, campaign status, etc. Comparisons can be made to stored 135 historical data.

In step 820, scores 415 can be updated and reported over the Internet to websites and social media 125 and sent over the alternative network 180 interface 181 to the donors 165 and campaign provider 170. The updated information 820 can also be stored 135 on the crowdfunding platform 50.

Figure 9:
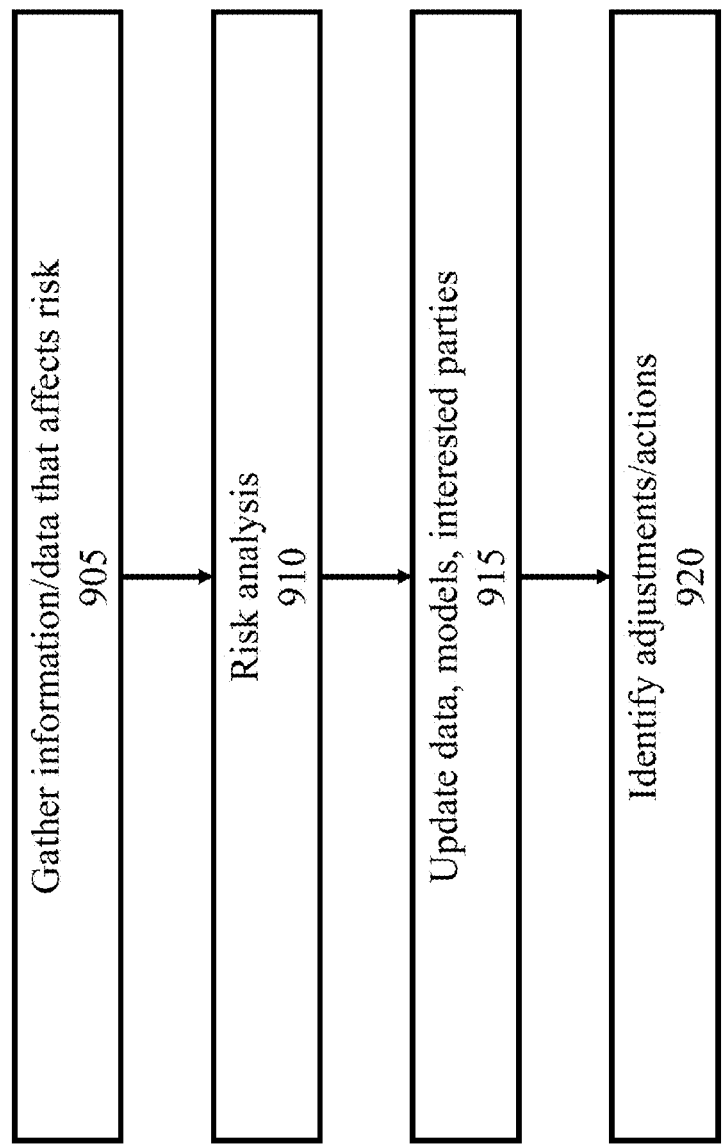
FIG. 9 is a flow chart of a risk assessment process.

FIG. 9 is a flow chart of a risk assessment process (900, 105).

In some embodiments, the risk assessment process (900, 105) runs repeatedly to continually update information on the crowdfunding platform 50 and provide the campaign provider 170, donors 165, and/or institutions 150 notice of problems with the campaign 25 before the problems occur or become worse. Providing risk information to the donors, institutions, and/or public (e.g. social media 125) makes the campaign 25 more transparent and gives the campaign 25 credibility.

Step 905 begins the risk assessment process (900, 105) by gathering data. In some embodiments, the data required is identified by the risk analysis 910 models, processes, etc. that are used. In general, the gathered data can include anything the is related to the outcome of the campaign 25.

Data is gathered from many sources. Data resident 135 on the crowdfunding platform, e.g. tracking data can be used. Institutional investors 150 and searches on the Internet can provide data. The campaign provider 170 and donors are also sources of data.

The data gathered 905 can be grouped by type. For example, cash flow or donation data can be provided by donors 165 or institutions 150. Sentiment data can be obtained by NLP of social media 125. The crowdsourcing platform 50 enables access to this data through processes on the platform 50 and connections (199, 181) to both the Internet 198 and alternative networks 180.

Step 910 performs the risk analysis. Various risk assessment techniques can be used. However, in some embodiments, a multi-dimensional risk database is constructed. In some embodiments, the risk database is updated in real-time.

The risk database can be constructed in multiple ways. For example, an n-dimensional vector can be defined for each of several risk categories. Each category vector would have a number of vector elements affecting the risk category. A financial category risk vector might have elements like the following: donor funding below a target by a certain date, project over spent after last milestone, etc. A sentiment risk category risk vector might have elements like the following: number of social media 125 website hits declining, increasing number of negative news articles about the campaign, etc. An endorsement category risk vector might have elements like: campaign provider found guilty of fraud, large donor withdraws pledge, etc. An environmental risk category risk vector might have elements like: flooding predicted for campaign location, access road is closed, a spam or virus attack on a computer system, etc.

In some embodiments, the vector elements are updated in real-time from information being gathered 905.

The risk analysis is run periodically using current data from the risk database. In some embodiments, machine learning, e.g. a rule-based analysis or a neural network, is used to do the risk analysis 910. The machine learning can be trained with historical data and can provide measures of risk to the campaign 25 for each risk category and/or for total risk in aggregate.

The machine learning processes can also provide corrective actions for risk that arise and "what if" assessments for reducing and/or eliminating the risk. For example, corrective actions might include replace campaign provider 170 with another, change the construction schedule, contact additional donors 165, etc.

The machine learning processes can also determine risk levels to the campaign 25 of different risks and recommend actions based on risk level when and to what extent a corrective action needs to occur.

Figure 10A:
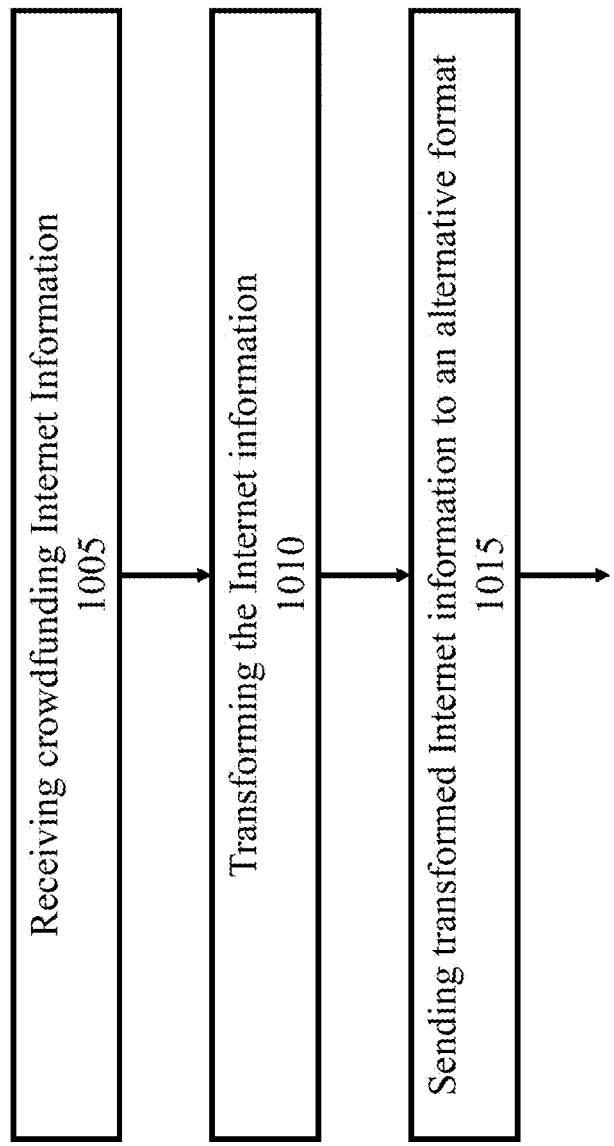
FIG. 10, comprising FIG. A (including steps 1005, 1010, and 1015) and FIG. B (including steps 1020, 1025, and 1030), is a flow chart of an operation process for the crowdfunding platform.
Figure 10B:
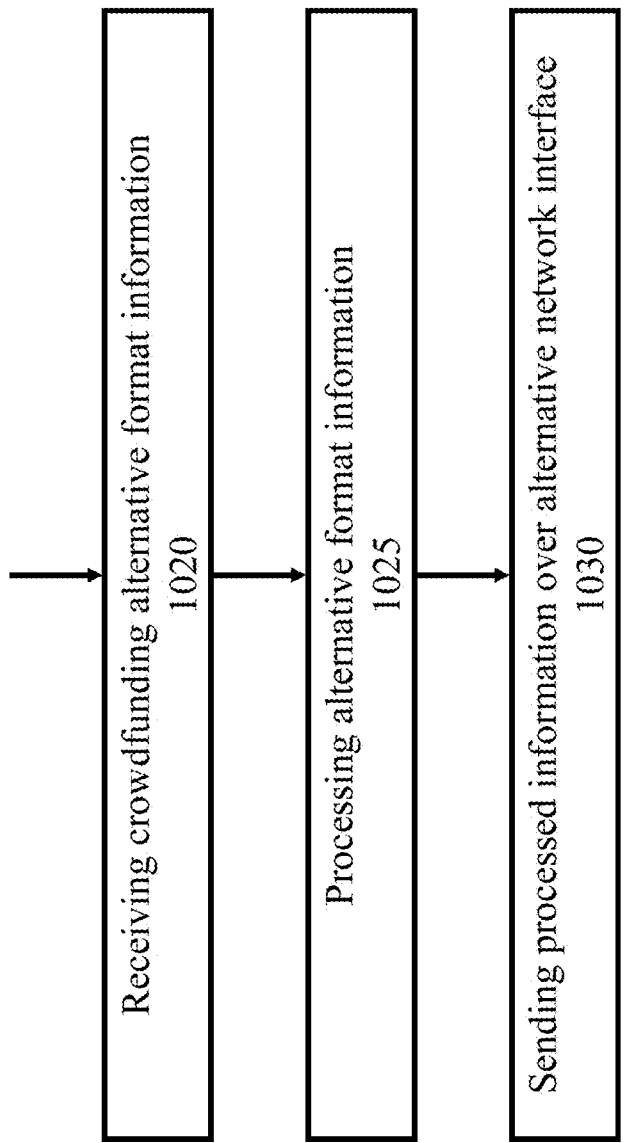

FIG. 10, comprising FIG. 10A and FIG. 10B, is a flow chart of an operation process 1000 for the crowdfunding platform 50.

The operation process for the crowdfunding platform 50 allows communication of information on the Internet 198 related to crowdfunding a campaign 25 to be transformed and communicated on one or more alternative networks 180 to devices 175 that may not have capability to operate effectively on the Internet 198.

The process 1000 begins with step 1005 where the crowdsourcing platform 50 receives crowdfunding information from the Internet 198 over one or more Internet interfaces 199. The Internet information received 1005 is in a format that functions on the Internet 198 but does not effectively function on alternative networks 180 and/or devices 175 having less functionality, e.g. function phones 175.

Step 1010 transforms 1010 the Internet information into a format that functions well on the alternative networks 180 and devices 175. For example, certain Internet information is processed and transformed into text data. In some embodiments, the internet information is transformed into an Unstructured Supplementary Service Data (USSD) or Short Message Service (SMS) format.

Step 1015 sends the transformed Internet information through one or more of the alternative interfaces 181, over one or more of the alternative networks 180 to the devices 175.

In step 1020 the crowdfunding platform receives crowdfunding information over one or more alternative interfaces 181 from one or more devices 175 over one or more of the alternative networks 180. In some embodiments, the received crowdfunding information is in an alternative format like USSD or SMS.

In step 1025, the alternative format and the received crowdfunding information is processed into a format that works effectively on the Internet 198 and/or provides more information.

In step 1030 the processed information is sent to the Internet 198 through one or more Internet interfaces 199 with crowdfunding platform 50.

Two examples of the operation of the crowdfunding platform 50 are now presented.

Example 1

Mr. Wamburu, the campaign provider 170, is a small scale farmer who drives community projects. He proposes a campaign 25 to build a borehole for his compound in order to reduce his community's reliance on water vendors. To this end he sends a text through a device 175 through an alternative network 180 to a crowdfunding platform 50 that uses the EndoCheck system (500, 190), He provides his mobile registration details via a template 620 on the Endocheck GUI 500 that the crowdfunding platform 50 sends to his device 175. The crowdfunding platform 50 enters 200 and stores 135 Mr. Wamburu's information. After parsing 210 Mr. Wamburu's information, the crowdfunding platform 50 transforms the information into one or more Internet queries to gather information that supports evaluation of Mr. Wamburu 170 and the project/campaign 25. For example, the crowdfunding platform 50 queries 155 a government registration database at a government agency 150 to verify Mr. Wamburu is who he says he is. For this type of project, machine learning programs require weather data and water supply data. The crowdfunding platform 50 queries an Internet source, e.g. online datasets other government agencies 150, to obtain this information. The machine learning programs use the acquired data to verify that the area proposed for the borehole campaign for has water problems. In addition, the crowdfunding platform 50 checks social media 125 and previous crowdfunding campaigns and sees that Mr. Wamburu has done campaigns such as these before. The crowdfunding platform 50 machine learning processes evaluate Mr. Wamburu 310 and the campaign 320 and assign 420 Mr. Wamburu's campaign 25 an endorsement score of 88. The crowdfunding platform 50 aggregates and transforms this information, e.g. on templates, and posts the transformed information to websites and/or social media 125 on the Internet 198. As his friends and/or other donors 165 start sharing the campaign information on different social media sites 125, the crowdfunding platform 50 dynamically executes the endorsement scorer 145 and increases the score to 92 due to increased social media interest. When some of his neighbors contribute to the campaign 25, the endorsement scorer 145 further adjusts the score to 96 since a funding target was exceeded. This score is updated on his campaign page giving more confidence to potential donors.

Example 2

Professor Akinyi is a lecturer at a local university who likes to donate to causes that further STEM education. While browsing a crowdfunding platform 50 that uses the Endo-Check QR system 605, she sees a campaign 25 seeking to raise money to build a school in Turkana, a very remote area. This peeks her interest, she takes out her smartphone 175, scans the QR code 195, and is taken to a breakdown of the campaign's description, goal, main contact person and overall score. Satisfied with the 90/100 score assigned to the campaign, she send her contribution to the campaign 25.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. For example, the devices, structures, and methods disclosed in accordance with embodiments of the present invention can be employed in applications, hardware, and/or electronic systems. Suitable hardware and systems for implementing embodiments of the invention may include, but are not limited to, personal computers, communication networks, electronic commerce systems, portable communications devices (e.g., cell and smart phones), solid-state media storage devices, expert and artificial intelligence systems, functional circuitry, etc, Systems and hardware incorporating the semiconductor devices are contemplated embodiments of the invention.

The terminology used herein was chosen to explain the principles of the embodiments and the practical application or technical improvement over technologies found in the marketplace or to otherwise enable others of ordinary skill in the art to understand the embodiments disclosed herein. Devices, components, elements, features, apparatus, systems, structures, techniques, and methods described with different terminology that perform substantially the same function, work in the substantial the same way, have substantially the same use, and/or perform the similar steps are contemplated as embodiments of this invention.

We claim:

1. A crowdfunding computer system comprising:
   one or more memories and one or more central processing units (CPUs);
   one or more alternative interfaces connected to one or more alternative networks, the alternative networks not capable of directly operating with the Internet;
   one or more Internet interfaces capable of connecting to the Internet; and
   an external entities interface that is a process executing by one or more of the CPUs, the external entities interface performing the steps of:
      receiving one or more standard forms;
      parsing the standard forms to obtain a required information from the standard forms for a crowdsourcing project;
      transforming the required information into a device format;
      providing a request for the required information request in device format and a template over one or more of the alternative interfaces to one or more devices using the device format, the devices having no Internet access;
      receiving the required information in the device format in the template over one or more of the alternative interfaces;
      transforming the required information in device format into one or more Internet queries about the crowdfunding project;
      sending the Internet queries through one of the Internet interfaces;
      receiving Internet acquired data over one of the Internet interfaces;
      translating the Internet acquired data into posted information in the device format; and
      sending the posted information in the device format over one or more of the Internet interfaces and the alternative interfaces.

2. The system, as in claim 1, where the posted information in the device format is in one or more of the following formats: Unstructured Supplementary Service Data (USSD) or Short Message Service (SMS).

3. The system, as in claim 1, where one or more of the alternative interfaces is connected to one or more of the alternative networks not having Internet capability and the alternative networks are connected to one or more devices that do not have capability to communicate with the Internet.

4. The system, as in claim 1, where the posted information includes one or more of the following: social media information, information about a campaign provider, information about a campaign, scoring information about a campaign, evaluations of a campaign, tracking of campaign status, financial information about a campaign, inquiries about funding, inquiries information for document entry, inquiries for information for contracts, and inquires for information about financing.

5. The system, as in claim 1, where the posted information includes one or more of the following formats: text, buttons, hyperlinks, templates, tables, graphs, images, an endocheck, an endorsement check page, and an endorsement badge.

6. The system, as in claim 5, where the posted information is the endocheck and the endocheck comprises one or more of the following features: a color-coded indication of a campaign status, campaign scoring information, campaign objectives completed information, endorsements, financial information, and one or more buttons that access more information.

7. The system, as in claim 5, where the posted information is the endorsement check page and the endorsement check page comprises one or more of the following features: a text field, an image, a template, a graph, campaign provider information, historical data, donor contribution information, funding information, and expenditure information.

8. The system, as in claim 5, where the posted information is the endorsement check page and the endorsement check page comprises one or more of the following features: a security code, an access code, a trademark, a score, a color-coded score, a funding status, a campaign status, and an emblem.

9. The system, as in claim 1, that through one or more of the Internet interfaces communicates the posted information through the Internet with one or more social media networks.

10. The system, as in claim 1, that through one or more of the Internet interfaces communicates through the Internet with one or more of the following: a government agency, a government program, a non-government organization (NGO's), a financial institution, a bank, a loan, a grant, an aid, an investor capital, and a donor.

11. The system, as in claim 1, where one or more potential donors are identified by one or more of the following: a geographic location of the donor, a donation pattern, one or more donor interests, a prior donation history, a frequency of donations, one or more characteristics of prior campaign donations, and one or more prior in-kind donations made by a donor.

12. The system, as in claim 1, further comprising a tracker process that tracks one or more of the following: a social media presence, a social media posting, and a social media commentary.

13. The system, as in claim 1, further comprising a tracker process that uses natural language processing (NLP) and machine learning techniques to analyze tracked data.

14. The system, as in claim 1, further comprising a risk assessment process that performs risk analysis to identify one or more of the following risks: failure to raise enough funding, failure to raise funding on time, weather risks, inefficiencies, transportation risks, fraud, spam, and virus attacks.

15. The system, as in claim 14, where the risk analysis is performed by machine learning.

16. The system, as in claim 15, where the machine learning uses a multi-dimensional risk database.

17. The system, as in claim 15, where the machine learning provides one or more risks and one or more of the risks has a risk level.

18. The system, as in claim 15, where the machine learning provides a corrective action for one or more of the risks identified.

19. A crowdfunding computer system comprising:
one or more memories and one or more central processing units (CPUs);
one or more alternative interfaces each alternative interface capable of connecting the crowdfunding computer system to an alternative network, the alternative network not capable of accessing the Internet but capable of communicating with one or more alternative devices, the alternative devices not capable of communicating with the Internet;
one or more Internet interfaces connecting the computer system to the Internet;
a crowdfunding operation process running on the crowdfunding platform, the crowdfunding operation process:
receiving alternative information about a crowdfunding project from one of the alternative interfaces in text format;
transforming the alternative information into one or more Internet queries about a crowdfunding project;
sending the Internet queires over one or more of the Internet interfaces;
receiving Internet acquired data over one or more of the Internet interfaces;
translating the Internet acquired data into posted information; and
sending the posted information over one of the alternative interfaces.

* * * * *